United States Patent
Anglin et al.

(10) Patent No.: US 7,807,297 B2
(45) Date of Patent: Oct. 5, 2010

(54) ALKALINE BATTERIES

(75) Inventors: David L. Anglin, Brookfield, CT (US); Alexander B. Shelekhin, Ridgefield, CT (US); Robert Yoppolo, New Milford, CT (US)

(73) Assignee: The Procter & Gamble Company, Cincinnati, OH (US)

( * ) Notice: Subject to any disclaimer, the term of this patent is extended or adjusted under 35 U.S.C. 154(b) by 48 days.

(21) Appl. No.: 12/132,894

(22) Filed: Jun. 4, 2008

(65) Prior Publication Data

US 2009/0305137 A1  Dec. 10, 2009

(51) Int. Cl.
*H01M 4/50* (2010.01)

(52) U.S. Cl. .................. 429/224; 429/229; 429/206; 429/163; 429/231.8; 429/176; 29/623.1

(58) Field of Classification Search ................. 429/224, 429/229, 206, 232, 163, 231.8, 176; 29/623.1
See application file for complete search history.

(56) References Cited

U.S. PATENT DOCUMENTS

| 7,314,681 B2 * | 1/2008 | Randell et al. ............... 429/224 |
| 2006/0035147 A1 * | 2/2006 | Lam et al. ................. 429/218.1 |

* cited by examiner

*Primary Examiner*—Laura S Weiner
(74) *Attorney, Agent, or Firm*—Vladimir Vitenberg; David M. Weirich

(57) ABSTRACT

Alkaline batteries are provided, including an anode, a cathode, and a separator disposed between the anode and cathode. The cathode porosity is selected to optimize performance characteristics of the battery. In one aspect, an alkaline cell is provided that includes (a) an anode, (b) a cathode, comprising a cathode active material, wherein the cathode has a porosity of from about 25% to about 30%, and (c) a separator disposed between the cathode and the anode.

15 Claims, 2 Drawing Sheets

ALKALINE BATTERIES

TECHNICAL FIELD

This invention relates to alkaline batteries.

BACKGROUND

Batteries are commonly used as electrical energy sources. A battery contains a negative electrode, typically called the anode, and a positive electrode, typically called the cathode. The anode contains an active material that can be oxidized. The cathode contains or consumes an active material that can be reduced. The anode active material is capable of reducing the cathode active material. A separator is disposed between the anode and cathode. These components are disposed in a metal can.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

There is a growing need to make batteries better suitable for high power application. Modern electronic devices such as cellular phones, digital cameras and toys, flash units, remote control toys, camcorders and high intensity lamps are examples of such high power applications. Such devices require high current drain rates of between about 0.5 and 2 Amp, typically between about 0.5 and 1.5 Amp. Correspondingly, they require operation at power demands between about 0.5 and 2 Watt. It is also desirable for batteries to have a long service life (or in the case of some applications, such as digital cameras, be able to deliver a large number of pulses of energy).

SUMMARY

In general, the invention features alkaline batteries. In some implementations, the battery comprises an anode, a cathode, and a separator disposed between the anode and cathode, and the cathode porosity and other characteristics of the cell are selected to optimize performance characteristics of the battery.

In one aspect, the invention features an alkaline cell comprising a cell housing having a wall thickness of less than 0.009 inch, and, within the cell housing (a) an anode, (b) a cathode, comprising a cathode active material, the cathode active material comprising electrolytic manganese dioxide, and graphite, the graphite being present in the cathode in a concentration of less than about 3.75%, wherein the cathode has a porosity of from about 25% to about 32%, and (c) a separator disposed between the cathode and the anode.

Some implementations include one or more of the following features. The cell housing has a thickness of less than 0.008 inch. The cathode active material comprises high power electrolytic manganese dioxide (HP EMD). The cathode further comprises carbon particles, e.g., graphite. The concentration of graphite in the cell is from about 2% to about 3.4%, e.g., about 3.0% to about 3.4%. The carbon particles comprise expanded graphite. The cathode contains about 2.5% to about 3.4% expanded graphite. The cathode has a porosity of from about 25.5% to about 28.5%. The anode comprises an anode active material comprising zinc. The zinc has an average particle size of less than 175 microns. The zinc loading in a zinc slurry used to manufacture the anode is from about 64% to about 69%. The separator comprises one or more substantially integral wraps.

In another aspect, the invention features a method of manufacturing a cathode for an alkaline cell, the method comprising: (a) forming a cathode comprising a cathode active material, the cathode active material comprising electrolytic manganese dioxide, and expanded graphite, the concentration of graphite in the cathode being less than about 3.75%; (b) controlling the porosity of the cathode so that it is in the range of about 22% to about 33%; and (c) inserting the cathode, an anode, and a separator into a cell housing having a wall thickness of less than about 0.009 inch.

Some implementations include one or more of the following features. The expanded graphite is provided in a concentration of less than 3.5% by weight, e.g., the concentration of expanded graphite is from about 2% to about 3.5%. The cathode active material comprises HP EMD. The anode comprises an anode active material comprising zinc. The zinc has an average particle size of less than 175 microns. The method further includes forming the anode using a zinc slurry having a zinc loading of about 64% to about 69%. The cathode porosity is controlled to between about 22% and about 30%.

The details of one or more embodiments of the invention are set forth in the accompanying drawings and the description below. Other features and advantages of the invention will be apparent from the description and drawings, and from the claims.

DETAILED DESCRIPTION

Figure 1:
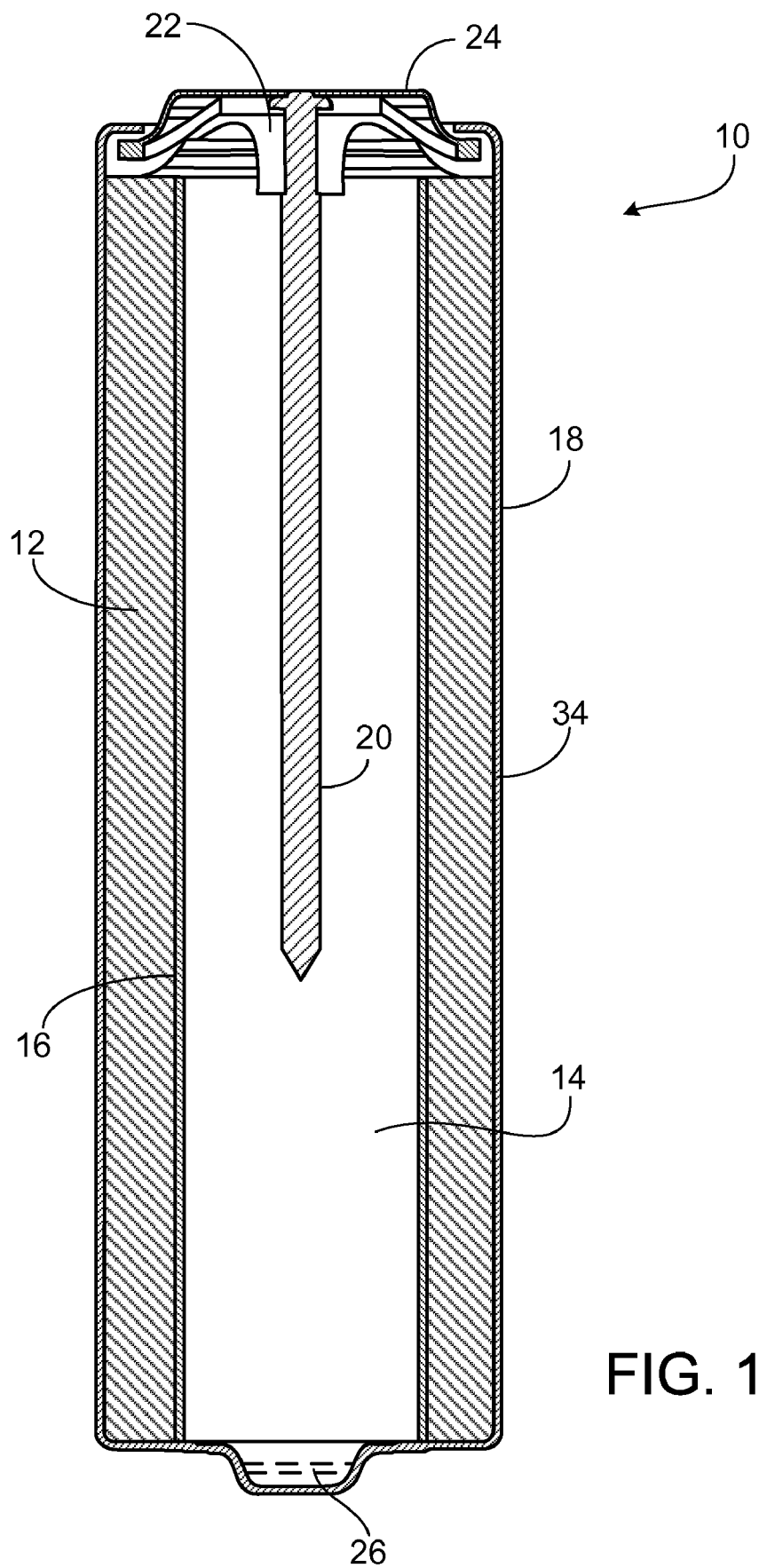
FIG. 1 is a schematic diagram of a battery.

Referring to FIG. 1, battery 10 includes a cathode 12, an anode 14, a separator 16 and a cylindrical housing 18. Battery 10 also includes current collector 20, seal 22, and a negative metal end cap 24, which serves as the negative terminal for the battery. A positive pip 26, which serves the positive terminal of the battery, is at the opposite end of the battery from the negative terminal. An electrolytic solution is dispersed throughout battery 10. Battery 10 can be an alkaline battery, for example, an AA, AAA, AAAA, C, or D battery.

Because the cylindrical housing 18 is very thin walled, e.g., typically from 0.25 mm to 0.15 mm wall thickness for AA and AAA cells, and 0.30 to 0.20 for C and D cells, it tends to be prone to distortion when the internal components of the cell swell during storage or use. Cell distortion is driven by cell discharge as the electro-chemical reaction creates internal stress. In general, as the can-body wall decreases, the cell distortion increases. It is important that the outer diameter of the cylindrical housing remain within dimensional specifications, in order to avoid damage to electronic devices in which the battery is used. The ideal cell would not show any distortion after discharge. This would allow the battery designer to maximize the cell performance by making the cell to the largest diameter possible that would not result in the cell being jammed in an appliance due to discharge distortion. The permissible degree of cell distortion varies depending on cell size, but is generally less than about 0.10 mm for an AA cell. Distortion is measured by passing a fresh labeled cell through a 50 mm tall ring gage at a diameter where the cell can pass with minimal resistance, and then re-testing it after discharge to determine the diameter increase required to accommodate the cell distortion associated with discharge. The inventors have found that cell distortion can be minimized by controlling certain parameters concerning the internal components, including the porosity of the cathode and, to a lesser extent, the loading of active material in the anode and the separator design. These parameters will be discussed in detail below.

It is noted that the concentrations given below are for the cathode at the assembly step. As a result of moisture evaporation, the cathode is richer in actives and carbon at the assembly stage than it is when the ingredients are first mixed.

Cathode 12 includes one or more cathode active materials, carbon particles, and a binder. The cathode may also include other additives. In order to minimize cell distortion while maintaining good cell performance, the cathode porosity should be between about 22% and about 31%, preferably between about 25.5% and about 28.5%. At lower porosities, the cell tends to distort outside of the dimensional specifications, while at higher porosities the cathode tends to become fragile and cell performance may suffer due to lower electrical conductivity of the cathode material. As a result, the cathode porosity is preferably toward the upper end of this range (e.g., 28-30%) for housings with a very thin wall (e.g., 0.006"), to tightly control distortion, and toward the lower end of this range (e.g., 26-28%) for housings with a thicker wall (e.g., 0.008"), to maximize cell performance. The cathode porosity is a calculated value based on the cathode at the time of manufacturing. The porosity changes over time due to swelling associated with discharge and the electrolyte wetting.

% Cathode Porosity=(1−(cathode solids volume÷cathode volume))×100

Examples of cathode active material include manganese dioxide, nickel oxyhydroxide, iron disulfide, silver oxide, or copper oxide.

A preferred cathode active material is manganese dioxide, having a purity of at least about 91 percent by weight. Electrolytic manganese dioxide (EMD) is a preferred form of manganese dioxide for electrochemical cells because of its high density and since it is conveniently obtained at high purity by electrolytic methods. Chemical manganese dioxide (CMD), a chemically synthesized manganese dioxide, has also been used as cathode active material in electrochemical cells including alkaline cells and heavy duty cells.

EMD is typically manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process", a chemical process disclosed by U.S. Pat. No. 2,956,860 (Welsh) for the manufacture of battery grade $MnO_2$ by employing the reaction mixture of $MnSO_4$ and an alkali metal chlorate, preferably $NaClO_3$. Distributors of manganese dioxides include Kerr McGee Co. (Trona D), Chem Metals Co., Tosoh, Delta Manganese, Mitsui Chemicals, JMC, and Xiangtan.

In some preferred implementations, particularly when very low or no cell distortion is required, high power (HP) EMD is used. The inventors have found that, when other factors are held constant, distortion is generally lower when HP EMD is used rather than conventional EMD. Preferably, the HP EMD has an open circuit voltage (OCV) of at least 1.635. A suitable high power EMD is commercially available from Tronox, under the tradename High Drain.

The table below summarizes the preferred ranges for graphite concentration and cathode porosity for both cathodes including HP EMD and standard (STD) EMD, for AA and AAA cells.

| Can Body Wall (inches) | Expanded Graphite (%) | HP EMD Finished Consolidation Porosity (%) | STD EMD Finished Consolidation Porosity (%) |
| --- | --- | --- | --- |
| 0.008 | 2-3.5 | 25.0-30 | 26.0-31 |
| 0.007 | 2-3.5 | 25.5-30 | 26.5-31 |
| 0.006 | 2-3.5 | 26.0-31 | 27.5-32 |

The carbon particles are included in the cathode to allow the electrons to flow through the cathode. The carbon particles are of synthetic expanded graphite. It is preferred that the amount of carbon particles in the cathode is relatively low, e.g., less than 4%, less than 3.75%, or even less than 3.5%, for example 2.0% to 3.5%. This carbon level allows the cathode to include a higher level of active material without increasing the volume of the cell or reducing the void volume (which must be maintained at or above a certain level to prevent internal pressure from rising too high as gas is generated within the cell).

Suitable expanded graphite particles can be obtained, for example, from Chuetsu Graphite Works, Ltd. (e.g., Chuetsu grades WH-20A and WH-20AF) of Japan or Timcal America (e.g., Westlake, Ohio, KS-Grade). A suitable graphite is available from Timcal under the tradename Timrex® BNB-90 graphite.

Some preferred cells contain from about 2% to about 3.5% expanded graphite by weight. In some implementations, this allows the level of EMD to be from about 89% to 91% by weight as supplied. (EMD contains about 1-1.5% moisture as supplied, so this range equates to about 88% to 90% pure EMD.) Preferably, the ratio of cathode active material to expanded graphite is greater than 25, and more preferably greater than 26 or even greater than 27. In some implementations, the ratio is between 25 and 33, e.g., between 27 and 30. These ratios are determined by analysis, ignoring any water.

It is generally preferred that the cathode be substantially free of natural graphite. While natural graphite particles provide lubricity to the cathode forming equipment, this type of graphite is significantly less conductive than expanded graphite, and thus it is necessary to use more in order to obtain the same cathode conductivity. If necessary, the cathode may include low levels of natural graphite, however this will compromise the reduction in graphite concentration that can be obtained while maintaining a particular cathode conductivity.

The cathode may be provided in the form of pressed pellets. For optimal processing, it is generally preferred that the cathode have a moisture level in the range of about 2.5% to about 5%, more preferably about 2.8% to about 4.6%. It is also generally preferred that the cathode have a porosity of from about 22% to about 30%, for a good balance of manufacturability, energy density, and integrity of the cathode.

Examples of binders that may be used in the cathode include polyethylene, polyacrylic acid, or a fluorocarbon resin, such as PVDF or PTFE. An example of a polyethylene binder is sold under the trade name COATHYLENE HA-1681 (available from Hoechst or DuPont).

Examples of other additives are described in, for example, U.S. Pat. Nos. 5,698,315, 5,919,598, and 5,997,775 and U.S. application Ser. No. 10/765,569.

An electrolyte solution can be dispersed throughout cathode 12, and the weight percentages provided above and below are determined after addition of the electrolyte solution. The electrolyte can be an aqueous solution of alkali hydroxide, such as potassium hydroxide or sodium hydroxide. The electrolyte can also be an aqueous solution of saline electrolyte, such as zinc chloride, ammonium chloride, magnesium perchlorate, magnesium bromide, or their combinations.

Anode 14 can be formed of an anode active material, a gelling agent, and minor amounts of additives, such as gassing inhibitor. In addition, a portion of the electrolyte solution discussed above is dispersed throughout the anode.

Examples of the anode active material include zinc. Preferably, to compensate for the increased active material in the cathode, the anode active material includes zinc having a fine particle size, e.g., an average particle size of less than 175 microns. The use of this type of zinc in alkaline cells is described in U.S. Pat. No. 6,521,378, the complete disclosure of which is incorporated herein by reference. The zinc loading also tends to affect the degree of cell distortion, with higher loadings tending to cause increased swelling of the anode. Preferably, the zinc loading in the zinc slurry used to manufacture the anode is from about 64% to about 69%, more preferably from about 66% to 68%.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof.

The anode may include a gassing inhibitor which can include an inorganic material, such as bismuth, tin, or indium. Alternatively, the gassing inhibitor can include an organic compound, such as a phosphate ester, an ionic surfactant or a nonionic surfactant.

Separator 16 can be a conventional alkaline battery separator. Preferably, the separator material is thin. For example, for an AA battery, the separator may have a wet thickness of less than 0.30 mm, preferably less than 0.20 mm and more preferably less than 0.10 mm, and a dry thickness of less than 0.10 mm, preferably less than 0.07 mm and more preferably less than 0.06 mm. The basis weight of the paper is generally in the range of about 20 to 80 g/m². In some preferred implementations the paper has a basis weight of 35 g/m² or less. In other embodiments, separators 16 and 42 can include a layer of cellophane combined with a layer of non-woven material. The separator also can include an additional layer of non-woven material.

In some implementations, the separator is wrapped about a mandrel to form a tube. In such cases, in order to minimize cell distortion, it is generally preferred that the number of wraps of the separator is an integer or "whole number" (e.g., 1, 2, 3, 4 . . . ), rather than a fractional number (e.g., 1.25). When the number of wraps is an integer, the cell discharge around the cell circumference tends to be more uniform than if the number of wraps contains a fractional amount. Due to practical limitations on manufacturing, it may not be possible to obtain exactly integral (whole number) wraps, however it is desirable to be as close to integral as possible, e.g., 0.8 to 1.2, 1.8 to 2.2, 2.8 to 3.2, etc. Separator designs of this kind will be referred to herein as having "substantially integral wraps."

Figure 2:
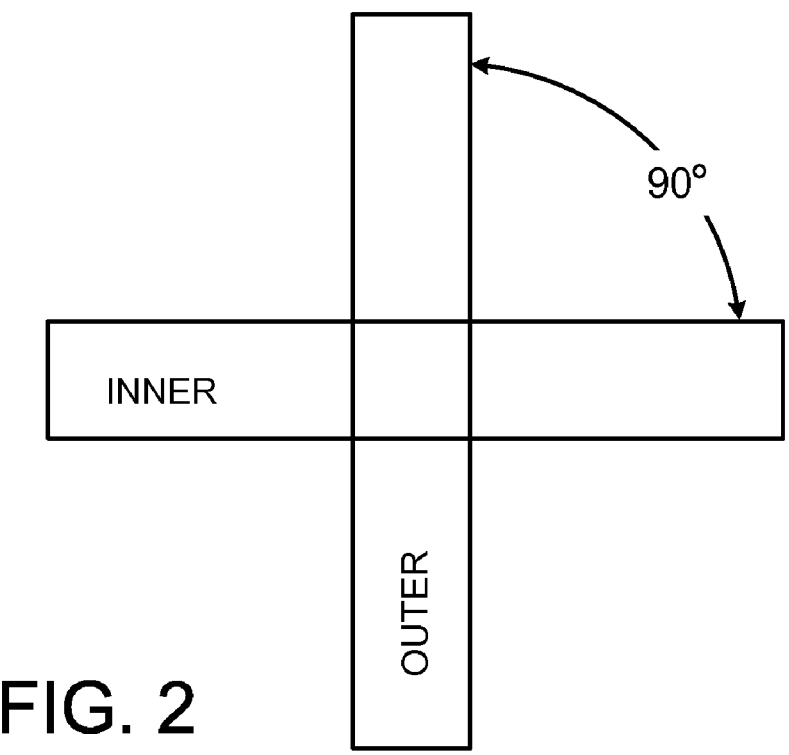
FIG. 2 is a top view of crossed separator strips.
Figure 3:
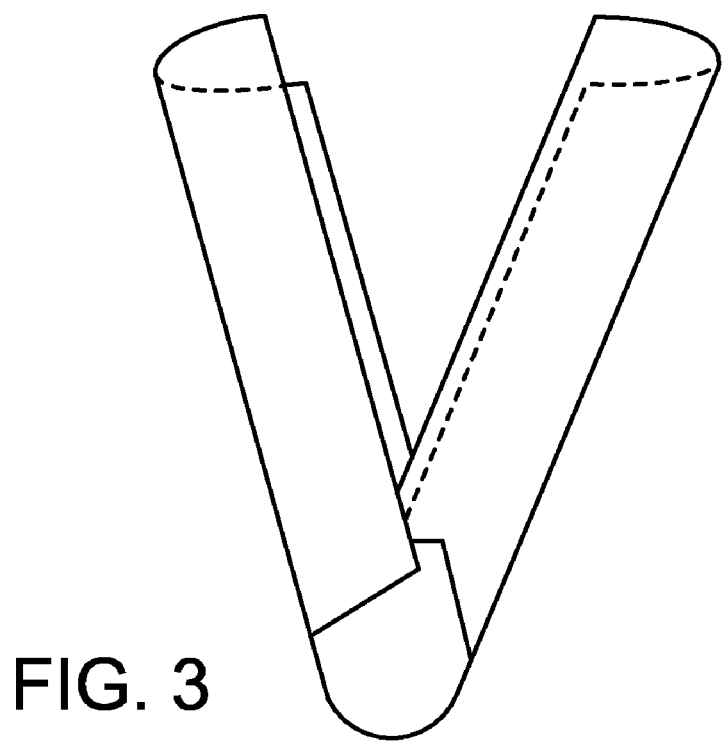
FIG. 3 is a perspective view showing an inner separator strip being folded to form a separator tube.

In other implementations, the separator tube is formed from two crossed strips, e.g., as shown in FIGS. 2 and 3. In this case, two strips of separator material are criss-crossed, as shown in FIG. 2, and then pushed into the bore of the cathode pellets. When two materials are pushed in, the sides rise up, form together, and make a quasi-"tube" inside the bore. FIG. 3 illustrates the manner in which the inner strip would fold during tube formation.

Housing 18 can be a conventional housing commonly used in primary alkaline batteries, for example, nickel plated cold-rolled steel. Current collector 20 can be made from a suitable metal, such as brass. Seal 22 can be made, for example, of a polyamide (Nylon).

In some preferred implementations, the cells exhibit very good service life and cell capacity, and very low cell distortion.

A number of embodiments of the invention have been described. Nevertheless, it will be understood that various modifications may be made without departing from the spirit and scope of the invention.

For example, carbon nanofibers can be used instead of expanded graphite at loadings from a low of 1% to as high as 5%.

Accordingly, other embodiments are within the scope of the following claims.

What is claimed is:

1. An alkaline cell comprising:
   a cell housing having a wall thickness of less than 0.008 inch; and,
   within the cell housing:
      an anode,
      a cathode, comprising a cathode active material, the cathode active material comprising manganese dioxide, and graphite, the graphite being present in the cathode in a concentration of less than 3.75% by weight, wherein the cathode has a porosity of from about 25% to about 33%, and
      a separator disposed between the cathode and the anode.

2. The alkaline cell of claim 1 wherein the concentration of graphite in the cell is from about 2% to about 3.4% by weight.

3. The alkaline cell of claim 1 wherein the cathode further comprises carbon particles.

4. The alkaline cell of claim 3 wherein the carbon particles comprise expanded graphite.

5. The alkaline cell of claim 4 wherein the cathode contains about 2.5% to about 3.4% by weight expanded graphite.

6. The alkaline cell of claim 1 wherein the cathode has a porosity of from about 25.5% to about 28.5%.

7. The alkaline cell of claim 1 wherein the anode comprises an anode active material comprising zinc.

8. The alkaline cell of claim 7 wherein the zinc has an average particle size of less than 175 microns.

9. The alkaline cell of claim 1 wherein the cathode active material comprises electrolytic manganese dioxide (EMD).

10. A method of manufacturing an alkaline cell, the method comprising:
    forming a cathode comprising manganese dioxide and expanded graphite,
    the concentration of graphite in the cathode being less than 3.75% by weight;
    controlling the porosity of the cathode so that it is in the range of about 22% to about 33%; and
    inserting the cathode, an anode, and a separator into a cell housing having a wall thickness of less than about 0.008 inch.

11. The method of claim 10 wherein the expanded graphite is provided in a concentration of less than 3.4% by weight.

12. The method of claim 11 wherein the concentration of expanded graphite in the cell is from about 2% to about 3.4% by weight.

13. The method of claim 10 wherein the anode comprises an anode active material comprising zinc.

14. The method of claim 13 wherein the zinc has an average particle size of less than 175 microns.

15. The method of claim 13 wherein the cathode active material comprises electrolytic manganese dioxide (EMD), the concentration of expanded graphite in the cathode is less than about 3.4% by weight, the porosity of the cathode is in the range of about 26% to about 31%, and the cell housing has a wall thickness of from about 0.007 to 0.008 inch.

* * * * *